(12) United States Patent
Batra

(10) Patent No.: US 7,796,038 B2
(45) Date of Patent: Sep. 14, 2010

(54) RFID SENSOR TAG WITH MANUAL MODES AND FUNCTIONS

(75) Inventor: Naresh Batra, Saratoga, CA (US)

(73) Assignee: Intelleflex Corporation, San Jose, CA (US)

( * ) Notice: Subject to any disclaimer, the term of this patent is extended or adjusted under 35 U.S.C. 154(b) by 645 days.

(21) Appl. No.: 11/423,699

(22) Filed: Jun. 12, 2006

(65) Prior Publication Data

US 2007/0285238 A1 Dec. 13, 2007

(51) Int. Cl.
*G08B 13/14* (2006.01)

(52) U.S. Cl. ............ 340/572.1; 340/539.1; 340/539.26; 340/539.3

(58) Field of Classification Search .............. 340/572.1, 340/10.1, 540, 539.26
See application file for complete search history.

(56) References Cited

U.S. PATENT DOCUMENTS

| | | | |
|---|---|---|---|
| 4,126,854 A | 11/1978 | Sheridon | 340/373 |
| 4,398,217 A | 8/1983 | Peters | 358/138 |
| 5,257,007 A | 10/1993 | Steil et al. | 340/539 |
| 5,313,848 A | 5/1994 | Santin et al. | 73/866.2 |
| 5,646,863 A * | 7/1997 | Morton | 702/23 |
| 5,847,798 A | 12/1998 | Yang et al. | 349/169 |
| RE36,200 E | 4/1999 | Berrian et al. | 73/866.2 |
| 6,008,727 A * | 12/1999 | Want et al. | 340/572.1 |
| 6,054,973 A | 4/2000 | Hughes et al. | 345/97 |
| 6,055,091 A | 4/2000 | Sheridon et al. | 359/296 |
| 6,061,107 A | 5/2000 | Yang et al. | 349/86 |
| 6,067,039 A * | 5/2000 | Pyner et al. | 342/125 |
| 6,147,791 A | 11/2000 | Sheridon | 359/296 |
| 6,151,096 A | 11/2000 | McDonnell et al. | 349/188 |
| 6,154,190 A | 11/2000 | Yang et al. | 345/94 |
| 6,198,394 B1 | 3/2001 | Jacobsen et al. | 340/573.1 |
| 6,300,871 B1 | 10/2001 | Irwin et al. | 340/539 |

(Continued)

FOREIGN PATENT DOCUMENTS

WO WO 98/03896 1/1998

(Continued)

OTHER PUBLICATIONS

Written Opinion and Search Report from PCT Application No. PCT/US07/13186 mailed on Sep. 26, 2008.

(Continued)

*Primary Examiner*—Toan N Pham
*Assistant Examiner*—Kerri McNally
(74) *Attorney, Agent, or Firm*—Zilka-Kotab, PC

(57) ABSTRACT

A Radio Frequency Identification (RFID) tag according to one embodiment includes a controller, a sensor in communication with the controller, a local power source for providing power to the controller, and a user input device for receiving manual input from a user. A function is selectable by manipulation of the user input device. An RFID tag according to another embodiment of the present invention includes a controller having activate circuitry, the activate circuitry being for detecting a valid activate command in an incoming signal and causing the tag to wake from a hibernate state. An electronic display device is in communication with the controller. A local power source provides power to the controller. A user input device receives manual input from a user. The tag is normally in a hibernate state. Manipulation of the user input device wakes the tag from the hibernate state and/or allows function selection.

47 Claims, 8 Drawing Sheets

U.S. PATENT DOCUMENTS

| | | | |
|---|---|---|---|
| 6,453,737 B2 | 9/2002 | Young et al. | 73/146.5 |
| 6,463,798 B2 | 10/2002 | Niekerk et al. | 73/146.2 |
| 6,507,276 B1 | 1/2003 | Young et al. | 340/447 |
| 6,581,449 B1 | 6/2003 | Brown et al. | 73/146 |
| 6,600,421 B2 | 7/2003 | Freeman | 340/573.1 |
| 6,617,963 B1 | 9/2003 | Watters et al. | 340/10.41 |
| 6,642,016 B1 | 11/2003 | Sjöholm et al. | 435/15 |
| 6,708,176 B2 | 3/2004 | Strunk et al. | 707/10 |
| 6,717,154 B2 | 4/2004 | Black et al. | 250/393 |
| 6,792,396 B2 | 9/2004 | Inda et al. | 702/188 |
| 6,806,808 B1 | 10/2004 | Watters et al. | 340/10.41 |
| 6,861,954 B2 | 3/2005 | Levin | 340/572.1 |
| 6,879,424 B2 | 4/2005 | Vincent et al. | 359/265 |
| 6,950,028 B2 | 9/2005 | Zweig | 340/588 |
| 7,209,030 B2 * | 4/2007 | Nolan et al. | 340/426.36 |
| 2002/0040968 A1 | 4/2002 | Black et al. | 250/393 |
| 2002/0067265 A1 | 6/2002 | Rudolph | 340/572.1 |
| 2002/0158762 A1 * | 10/2002 | Nguyen et al. | 340/572.9 |
| 2002/0171081 A1 | 11/2002 | Vincent et al. | 257/40 |
| 2003/0179246 A1 | 9/2003 | Marmaropoulos et al. | 345/811 |
| 2003/0218469 A1 * | 11/2003 | Brazell et al. | 324/637 |
| 2004/0100380 A1 | 5/2004 | Lindsay et al. | 340/540 |
| 2004/0124988 A1 | 7/2004 | Leonard et al. | 340/612 |
| 2004/0131498 A1 * | 7/2004 | Kuutti | 422/58 |
| 2004/0201454 A1 | 10/2004 | Waterhouse et al. | 340/10.1 |
| 2004/0209028 A1 | 10/2004 | Gosselin | 428/40.1 |
| 2004/0211840 A1 | 10/2004 | Yogev et al. | 235/491 |
| 2004/0212493 A1 | 10/2004 | Stilp | 340/531 |
| 2004/0212507 A1 | 10/2004 | Zweig | 340/588 |
| 2004/0250108 A1 * | 12/2004 | Parsons et al. | 713/200 |
| 2005/0083197 A1 * | 4/2005 | Glenn et al. | 340/539.22 |
| 2005/0088299 A1 | 4/2005 | Bandy et al. | 340/539.16 |
| 2005/0099275 A1 * | 5/2005 | Kamdar et al. | 340/426.18 |
| 2005/0134461 A1 | 6/2005 | Gelbman et al. | 340/572.8 |
| 2005/0148828 A1 | 7/2005 | Lindsay | 600/300 |
| 2005/0162277 A1 | 7/2005 | Teplitxky et al. | 340/572.8 |
| 2005/0211761 A1 | 9/2005 | Anttila et al. | 235/376 |
| 2005/0218218 A1 | 10/2005 | Koster | 235/383 |
| 2006/0090079 A1 | 4/2006 | Oh et al. | 713/186 |
| 2006/0202804 A1 * | 9/2006 | Vijay-Pillai et al. | 340/10.33 |
| 2006/0226992 A1 * | 10/2006 | Al-Ali et al. | 340/573.1 |
| 2006/0290519 A1 * | 12/2006 | Boate et al. | 340/573.4 |
| 2007/0085677 A1 * | 4/2007 | Neff et al. | 340/539.22 |
| 2007/0171957 A1 * | 7/2007 | Harris | 374/121 |
| 2007/0285099 A1 * | 12/2007 | Lorimer et al. | 324/446 |

FOREIGN PATENT DOCUMENTS

| | | |
|---|---|---|
| WO | WO 98/04953 | 2/1998 |
| WO | WO 98/19208 | 5/1998 |
| WO | WO 98/41898 | 9/1998 |
| WO | WO 98/41899 | 9/1998 |
| WO | WO 99/34251 | 7/1999 |
| WO | WO 00/52671 | 9/2000 |

OTHER PUBLICATIONS

International Preliminary Examination Report from PCT Application No. PCT/US07/13186 mailed on Jul. 6, 2009.

* cited by examiner

RFID SENSOR TAG WITH MANUAL MODES AND FUNCTIONS

FIELD OF THE INVENTION

The present invention relates to Radio Frequency Identification (RFID) systems, and more particularly, this invention relates to RFID sensor tags having manually-selectable modes and functions.

BACKGROUND OF THE INVENTION

RFID systems are fast becoming the identification medium of choice due to the speed and accuracy with which a user can identify the quantity and type of tagged items present. RFID also holds promise as a medium for gathering information about tagged items and their environments, such as temperature history profiling. However, one major drawback of RFID when used in the supply chain to monitor, for example, a temperature history profile of goods in transit, is that the user must have an interrogator present in order to read the temperature history profile. Nor can the user take a reading manually without having a reader present to instruct an RFID tag to take a reading. Consider the following.

Many materials in use in commerce, medicine, and other areas are perishable. That is, the materials have a tendency to deteriorate with time, and this tendency to deteriorate is often accelerated by exposure to higher temperatures. This tendency to deteriorate is often designated as a material's "stability". A material that deteriorates slowly in response to higher temperatures over long periods of time is said to have a "high stability". By contrast, a material that deteriorates quickly in response to higher temperatures is said to have a "low stability".

Examples of deterioration includes spoilage in the case of biological materials, loss of potency in the case of drugs, loss of chemical reactivity in the case of chemicals, or alternatively formation of unwanted contaminants, etc. Excessive deterioration eventually results in the material in question being rendered unfit to use, or even rendered dangerous. Thus for commerce, medicine, and other areas, the rapid detection of materials rendered unfit to use by an unacceptable thermal history is very important.

Additionally, there are alternative situations where a material must undergo a certain minimal thermal history before it becomes fit for use. There are many materials, and material treatment processes, commonly used for construction, manufacturing, food preparation, and pharmaceutical preparation, such as concrete setting, epoxy hardening, biological fermentation, cooking, pasteurization, sterilization and the like, where the material needs to be properly cured, incubated, or heat treated before the material is fit to use. Since curing, incubation, or heat treatment processes are often temperature dependent, typically taking longer to proceed at lower temperatures, such materials must undergo a certain minimal time-temperature history before they are fit for use.

As a result, visual time-temperature indicators are widely used in many areas of commerce. These are typically small devices that are affixed to a container of thermally sensitive material. For example, visual time-temperature indicators are often used to verify that a perishable, temperature sensitive product has been transported from the manufacturer to the user via a transport process that has preserved the "cold chain". Here, a "cold chain" means a continuous system for conserving and preserving materials at precise temperatures from production to use, so that the integrity of the materials is assured.

One type of time-temperature device relies on a chemical reaction that mimics the degradation of the product to which attached. Another type of time-temperature device merely records the temperature profile for later output, with no other functionality. One drawback of such devices is that such devices may not be reusable. Rather, the device is used once and discarded. This can be expensive. Another drawback of such devices is that the device are typically not accurate. For example, known visual temperature indicators which are chemically mediated give immediate visual results, but are not particularly accurate. These chemicals indicators attempt to mimic the degradation characteristics of a material of interest by finding a different sensor material chemical with complementary degradation characteristics, such that observations of the change in the sensor material correspond to alterations in the material of interest. The drawback of this chemical approach, however, is that most materials of interest, such as biological materials, often may have unique and complex time-temperature profiles. In particular, some materials may have time-temperature degradation characteristics that differ profoundly from simple exponential (Arrhenius profile) degradation rates. By contrast, however, there are only a limited number of sensor chemicals that are suitable for visual time-temperature indicators. It is often difficult or impossible to find an exact match, over all temperatures, between the degradation rate of the sensor chemical, and the degradation rate of the material of interest. As a result of these matching problems, the present practice is to be conservative. That is, chemical time-temperature indicators are usually set to degrade more quickly than the material of interests. Although this scenario will insure that the user does not inadvertently accept degraded material, it is inefficient. In many cases, material that is, in fact, still good may be inappropriately discarded due to poor time-temperature indicator accuracy. Of course, the alternative scenario, in which the chemical time-temperature indicator fails to adequately warn that the tracked material is degraded, is both unacceptable and potentially dangerous. A further drawback of such devices is that they are prone to tampering. Particularly, unless the device has a unique ID, a device indicating that an adverse condition has occurred can easily be swapped with a new device reflecting no adverse condition. To avoid tampering, the device can be placed inside the packaging of the products to be monitored. However, the device is then not visually accessible until the package is opened.

Another type of non-visual time-temperature device is an RFID tag that records a temperature profile. However, such tags require an RFID interrogator to query the tags in order to extract the profile. Thus, a user may not be readily able to analyze the temperature profile unless he or she has an interrogator present. In the fast-paced world of supply chain operations, by the time the user is able to scan the tag for the data, he may have already accepted spoiled goods.

Further, because an RFID tag will only take readings when scheduled or instructed via an RFID interrogator, the user is unable to manually instruct the RFID tag to take a reading without having an RFID interrogator present.

There is therefore a need for an RFID tag that is capable of both electronic and manual initialization of functionality, and which overcomes the drawbacks mentioned above.

SUMMARY OF THE INVENTION

A Radio Frequency Identification (RFID) tag according to one embodiment includes a controller, a sensor in communication with the controller, a local power source for providing power to the controller, and a user input device for receiving manual input from a user. A function is selectable by manipulation of the user input device.

A portion of the controller may normally be in a hibernate state. To that end, the tag may include activate circuitry, the activate circuitry being for detecting a valid activate command in an incoming signal and causing the tag to wake from a hibernate state. Manipulation of the user input device may cause the controller to wake from the hibernate state, either via the activate circuitry or other mechanism. To maximize power conservation, the activate circuitry may be in a powered down initial state, where a signal form a user input device causes initialization of at least the activate circuitry.

The sensor may detect an environmental condition, the sensor taking a reading upon manipulation of the user input device. Illustrative environmental conditions include: temperature, humidity, Ph, sunlight, ultraviolet light, chemicals, radioactivity, pathogens, presence of bacteria, presence of viruses, presence of prions, carbon dioxide level, and combinations thereof. The sensor may also detect a condition of an object to which attached, the sensor taking a reading upon manipulation of the user input device.

As noted above, manipulation of the user input device initiates some function. One such function is taking a one-time reading by the sensor. Another selectable function is output of a reading of the sensor, such as a current reading, a maximum reading and a minimum reading of the sensor. Similarly, the function may be causing output of a historical compilation based on readings of the sensor. Yet another function is selection and initialization of a mode of operation of the tag, such as a data gathering mode using the sensor. A further function is alteration of parameters of such a mode.

An RFID tag according to another embodiment of the present invention includes a controller having activate circuitry, the activate circuitry being for detecting a valid activate command in an incoming signal and causing the tag to wake from a hibernate state. An electronic display device is in communication with the controller. A local power source provides power to the controller. A user input device receives manual input from a user. The tag is normally in a hibernate state. Manipulation of the user input device wakes the tag from the hibernate state, and also may be used to select functions as described above. A sensor may also be present. The visual display device may provide a visual indicator of occurrence of an alarm condition.

An RFID system includes a plurality of RFID tags and an RFID interrogator in communication with the RFID tags. Each tag may be coupled to an object, each tag storing information about the object to which coupled. Likewise, each tag may have a unique identifier, the identifier being correlated with information about the object in a database.

A method for taking a sensor reading upon receiving manual user input according to one embodiment of the present invention includes detecting manipulation of a user input device, and taking a sensor reading upon detecting the manipulation of the user input device.

A method for outputting a sensor reading upon receiving manual user input includes detecting manipulation of a user input device, and outputting a sensor reading upon detecting the manipulation of the user input device.

Other aspects and advantages of the present invention will become apparent from the following detailed description, which, when taken in conjunction with the drawings, illustrate by way of example the principles of the invention.

BRIEF DESCRIPTION OF THE DRAWINGS

For al fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terns are to be given their broadest possible interpretation including meanings implied from the specification as well as meanings understood by those skilled in the art and as defined in dictionaries, treatises, etc.

The following description discloses new RFID systems and methods for providing a visual or tactile indication of occurrence of a predetermined condition or event.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag.

Figure 1:
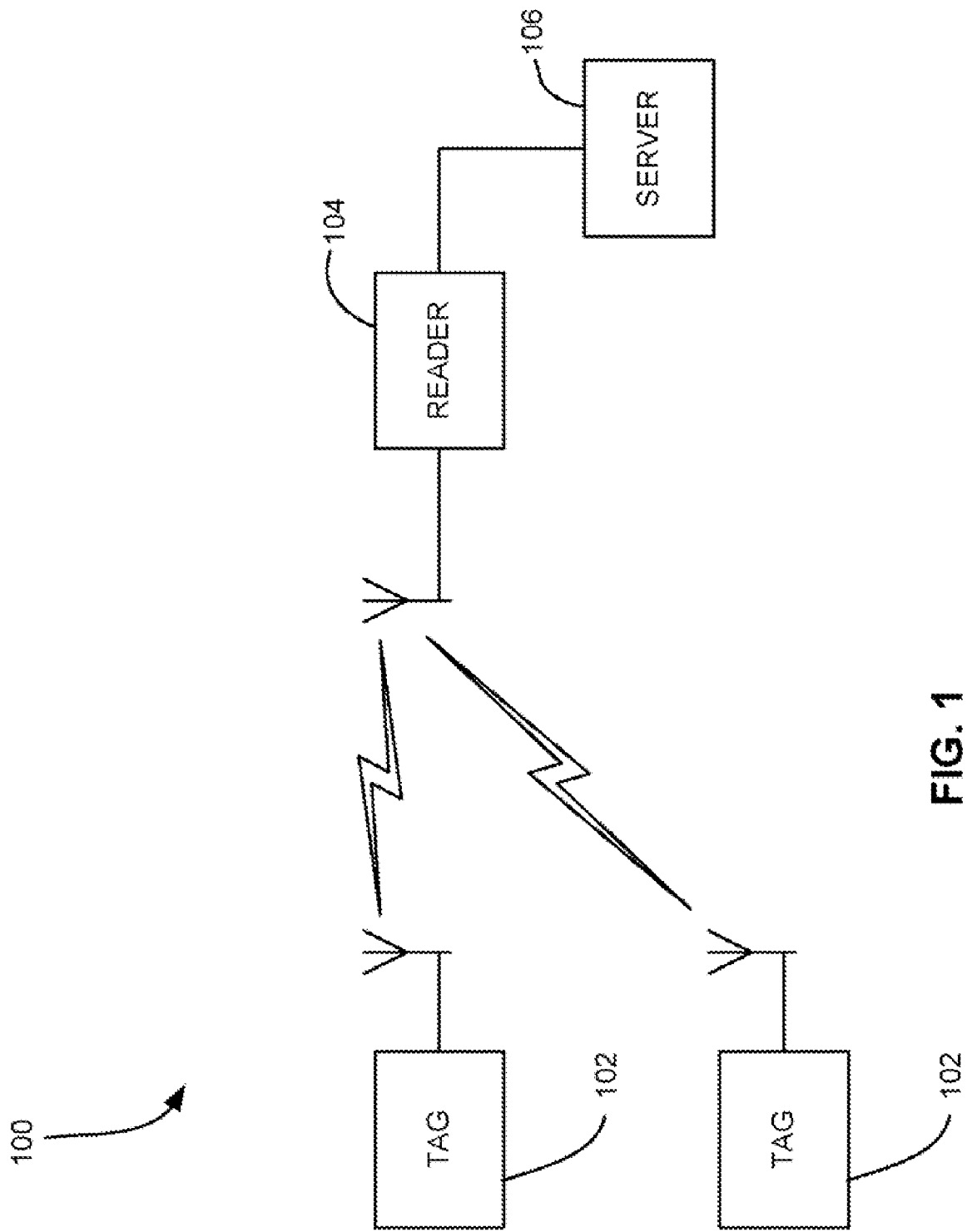
FIG. 1 is a system diagram of an RFID system according to one embodiment of the present invention.

As shown in FIG. 1, an RFID system 100 typically includes RFID tags 102, an interrogator or "reader" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the interrogator 104. The chip may also include a power supply circuit to extract and regulate power from the RF interrogator; a detector to decode signals from the interrogator; a backscatter modulator, a transmitter to send data back to the interrogator; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:
  1. Header, which identifies the length, type, structure, version and generation of EPC;
  2. Manager Number, which identifies the company or company entity;
  3. Object Class, similar to a stock keeping unit or SKU; and
  4. Serial Number, which is the specific instance of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

Communication begins with an interrogator 104 sending out signals via radio wave to find a tag 102. When the radio wave hits the tag 102 and the tag 102 recognizes and responds to the interrogator's signal, the interrogator 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the interrogator 104. Since passive (Class-1 and Class-2) tags get all of their power from the interrogator signal, the tags are only powered when in the beam of the interrogator 104.

The Auto ID Center EPC-Compliant tag classes are set forth below:
  Class-1
    Identity tags (RF user programmable, range ~3 m)
    Lowest cost
  Class-2
    Memory tags (20 bit address space programmable at ~3 m range)
    Security & privacy protection
    Low cost
  Class-3
    Semi-passive tags (also called semi-active tags)
    Battery tags (256 bits to 2M words)
    Self-Powered Backscatter (internal clock, sensor interface support)
    ~100 meter range
    Moderate cost
  Class-4
    Active tags
    Active transmission (permits tag-speaks-first operating modes)
    ~30,000 meter range
    Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the interrogator to respond. Class-3 tags only need a 5 mV signal from the interrogator in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (860 MHz to 960 MHz and 2.4 GHz to 2.5 GHz) tags offer increased read ranges and high reading speeds. One illustrative application of high frequency tags is automated toll collection on highways and interstates.

Figure 2:
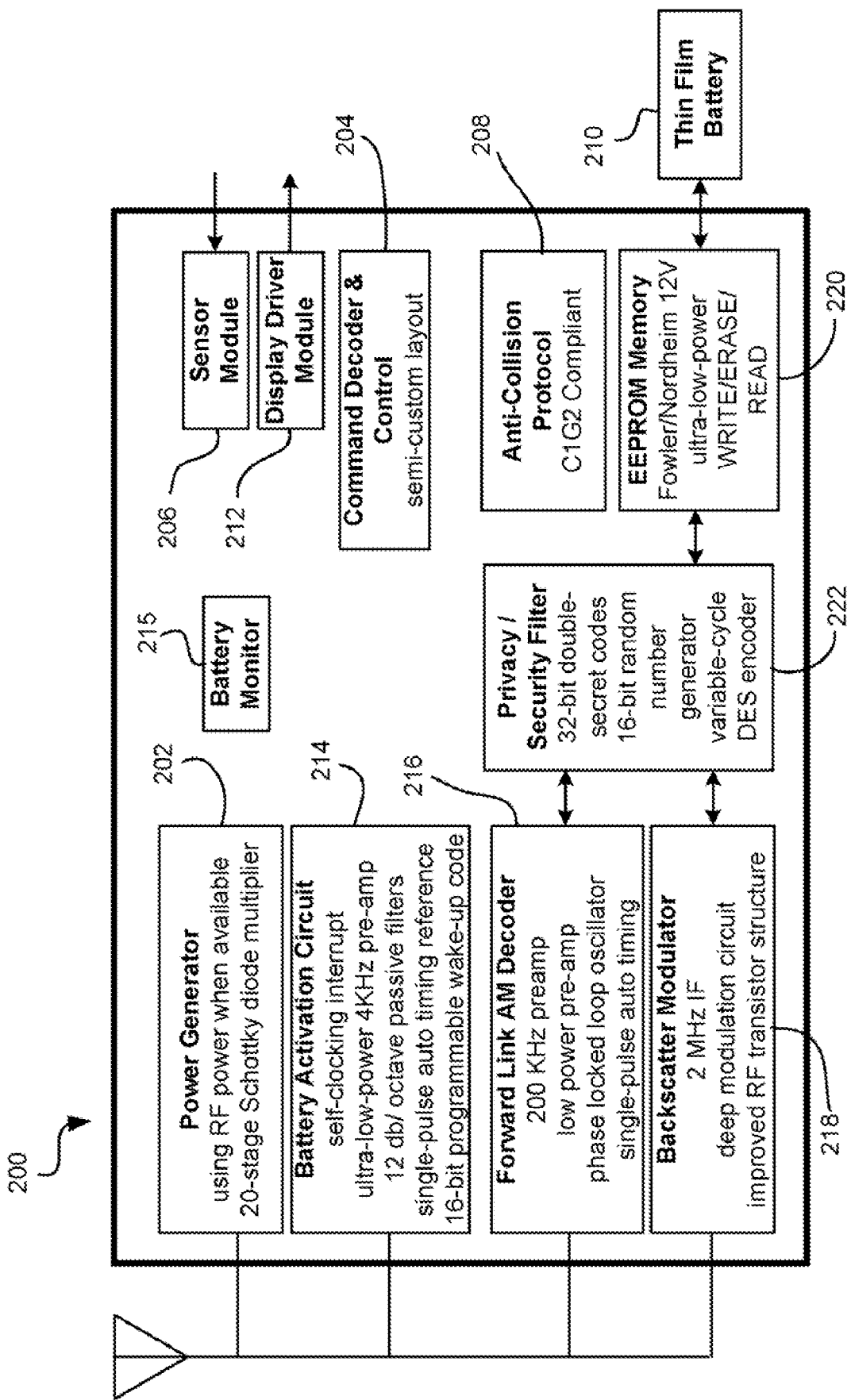
FIG. 2 is a system diagram for an integrated circuit (IC) chip for implementation in an RFID tag according to one embodiment of the present invention.

Embodiments of the present invention are preferably implemented in a Class-3 or higher Class chip. FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the interrogator can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210. While any type of battery activation circuit known in the art can be potentially integrated into the system, an illustrative battery activation circuit 214 is described in copending U.S. patent application Ser. No. 11/007,973 filed Dec. 8, 2004 with title "BATTERY ACTIVATION CIRCUIT", which is herein incorporated by reference.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements. The memory is preferably present with a capacity sufficient to store several sensor readings and data associated with it such as time, date, etc. as well as provide memory for processing on the chip.

The module 200 may also incorporate a highly-simplified, yet very effective, security encryption circuit 222. Other security schemes, secret handshakes with interrogators, etc. can be used.

Only four connection pads (not shown) are required for the chip 200 to function: Vdd to the battery, ground, plus two antenna leads to support multi-element omni-directional and isotropic antennas. Sensors to monitor temperature, shock, tampering, etc. can be added by appending an industry-standard I²C or SPI interface to the core chip.

It should be kept in mind that the present invention can be implemented using any type of tag, and the circuit 200 described above is presented as only one possible implementation.

Many types of devices can take advantage of the embodiments disclosed herein, including but not limited to RFID systems and other wireless devices/systems. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, the invention can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon. A. computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

A computer for storing and/or executing the code and/or performing the processes described herein can be any type of computing device, including a personal computer (PC), laptop PC, handheld device (e.g., personal digital assistant (PDA)), portable telephone, etc.

As mentioned above, REID tags may be coupled to objects, each tag being associated with and optionally storing information about the object to which coupled. A tagged object can be identified and located by identifying and locating the tag coupled to it.

Figure 3:
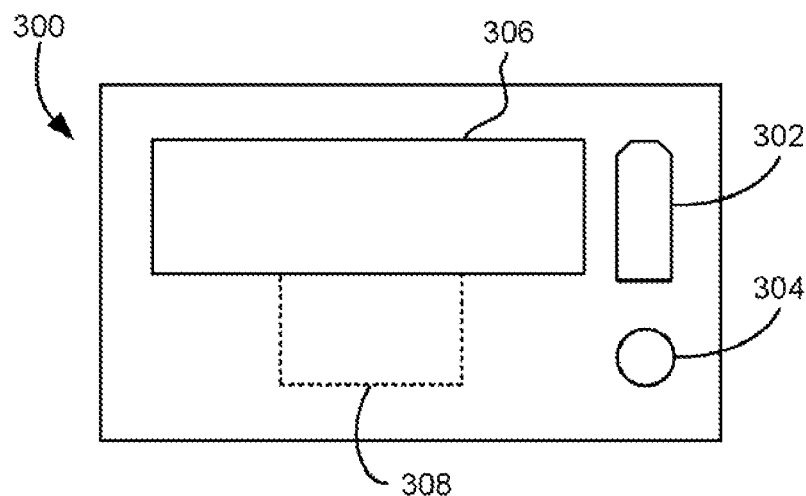
FIG. 3 is a side view of an RFID tag with a display device and sensor capability according to one embodiment of the present invention.

FIG. 3 illustrates a semi-passive (or active) RFID tag 300 with display device and sensor capability such that an environmental condition-based alarm condition is signaled by a single or multiple bits that trigger a change in color of a color stripe, thereby providing a visual indication that the alarm condition has occurred. As shown, the tag 300 includes one or more sensors 302, 304 for detecting one or more environmental conditions. The tag 300 also includes a visual display device 306.

Upon the tag 300 detecting an alarm condition based on sensor output, the visual display device 306 is instructed or engaged to display a visual indicator of the alarm condition. For example, a visual indicator can be a simple color change, the placement of a symbol such as a circle or triangle, or can include a number of textual or graphical representations.

The tag 300 can be attached to an item utilizing numerous mechanisms. For example, conventional mechanical fastening system, loop and hook-type arrangements, stitches, adhesives, as well as other known fixation techniques may be employed to permanently or temporarily attach the tag 300 to an item. The tag 300 can also be integrally formed with the item, or can be used as a stand alone device.

The sensors 302, 304 monitor the external environment in which the tag 300 is operating. Virtually any environmental condition can be monitored. Illustrative sensors monitor temperature, humidity, Ph, sunlight, ultraviolet light, chemicals, radioactivity, pathogens, bacteria, viruses, prions, carbon dioxide level, etc. in the environment surrounding the tag 300. Alarm conditions can be based on exceeding levels or quantities, such as passing a threshold high temperature, falling below a threshold low temperature, or detecting a certain number of viruses. Alarm conditions can also be based on historic data, such as a number of hours that the carbon dioxide level was above a threshold. For example, in one embodiment an internal or external temperature sensor can be employed so that in the event that the tag 300 experiences a period below freezing, a visual indicator on the visual display 306 will be on display to a user, who can quickly ascertain that an alarm condition has occurred.

One or more of the sensors can also monitor a condition, e.g., characteristic or property, of the item to which attached, as opposed to an environmental condition. One example includes monitoring a surface temperature of the object to which attached.

The sensors 302, 304 may take readings continuously, or may take readings at some interval, such as every 5 minutes, every hour, etc. The tag may enter a hibernate state during the interval period between readings to conserve battery power.

A controller 308 on the tag is coupled to the sensors 302, 304 and sets an alarm state based on output from one (or more) of the sensors. The controller 308 controls the activation of the visual display device 306 upon detecting the Examples of operation will be provided below. The controller 308 may include one or more silicon chips, programmable microcontrollers or discrete components. The controller can set an alarm flag to indicate the alarm condition. Preferably the alarm flag is one or more bits stored in memory on the tag. A logic zero indicates a normal condition, while logic one indicates an active alarm state (or vice versa). The flag preferably remains set until reset by an authorized entity.

The visual indicator of the visual display device 306 remains present on the visual display device 306 either permanently, or until the tag receives an instruction to revert to a non-alarm state from an authorized entity. An authorized entity may be the end recipient of goods previously in transit, a system administrator, a security service, a computerized system, etc. Validation of the authorized entity by the tag 300 can be based on receipt of a password or secret code for example. By only allowing an authorized entity to disengage the alarm state, tampering with the tag is prevented. Also, because the ID of the tag is known and associated with a certain object, the tag cannot merely be replaced with another tag not displaying the alarm condition visual indicator. Accordingly, upon a tagged item arriving at its destination, the tag may be scanned to verify its identity, e.g., by comparing the tags EPC to the EPC shown on a shipping order.

The visual display device 306 can be any type of display device. Illustrative visual display devices include color-changing strips, electrophoretic displays, electrokinetic displays, light emitting diodes (LEDs), liquid crystal displays (LCDs), etc. One practicing the invention will understand that the type of visual display device 306 used will depend on the power supply to the tag. If the tag has a virtually unlimited power supply, e.g., is coupled to a vehicle battery, then visual display devices using higher power may be used. If the tag has a limited power supply, e.g., onboard battery, low power visual display devices such as state changing electrochemical stips are preferred.

In preferred embodiments, the visual display device 306 is an ultra-low power display device, so as to use as little battery power as possible and thereby maximize the active life of the tag 300 (the tag may remain useful as a passive tag after the battery is expended). The visual display device 306 is preferably one that continues to display the visual indicator even after power to the display device is removed. This minimized power consumption, which is of particular importance for RFID tags of limited battery life. A preferred visual display device 306 includes a chemical strip that changes color upon receiving an electrical signal from the controller 308. The color change is permanent until reset electronically by the controller 308, and does not require a continuous electric current to maintain the color change.

The display media of the visual display device 306 can be a bi-stable, non-volatile display medium. Examples of bi-stable non-volatile mediums include but are not limited to encapsulated and un-encapsulated electrophoretic material, Cholesteric materials, polymer dispersed cholesteric liquid crystals (PDChLC), encapsulated cholesteric materials, separated redox and dye reaction materials such as Dow Commotion.RTM. display medium, ph sensitive dyes, electrothermochromics displays and thermo-chromic, zenithal hi-stable, nematic, and surface stabilized ferroelectric liquid crystals.

The display media can further comprise electronic ink, wherein the electronic ink is capable of displaying a graphical indicator on the electronic label. The term "electronic ink" as used herein is intended to include any suitable bi-stable, non-volatile material. The term "bi-stable" as used herein is intended to indicate that the particles of the imaging material can alternately occupy two stable states. For example, the particles corresponding to different pixel locations of the display assembly can alternately occupy an ON or an OFF state to form selected indicia.

In an illustrative embodiment, the display media is reflective to provide a greater viewing angle to the image displayed by the electronic label. In this case, the particles in the imaging material can be oriented in a first state to reflect light (ON) or a second state to absorb light (OFF). The term "non-volatile" as used herein is intended to denote that the imaging material has indefinite memory without power and will retain an image in the absence of power to the visual display device 306. The particles in the imaging material maintain a first state unless actively directed to change to a second state. Thus, the imaging surface of the label shows a high-quality image even when power to the visual display device 306 is turned off. The electronic ink can also be a printable, conductive ink having an arrangement of particles or microscopic containers or microcapsules. Each microcapsule has disposed therein an electrophoretic composition of a fluid, such as a dielectric or emulsion fluid, and a suspension of colored or charged particles or colloidal material. The diameter of the microcapsules typically ranges from about 30 to about 300 microns.

According to one practice, the particles visually, contrast with the dielectric fluid. According to another example, the electronic ink can include rotatable balls that can rotate to expose a different colored surface area, and which can migrate between a forward viewing position and/or a rear non-viewing position, or both. On example of such a material is a gyricon. Gyricon is a material comprised of twisting rotating elements contained in liquid-filled spherical cavities and embedded in an elastomer medium. The rotating elements can be made to exhibit changes in optical properties by the imposition of an external electric field. Upon application of an electric field of a given polarity, one segment of a rotating element rotates toward, and is visible by an observer of the display. Application of an electric field of opposite polarity, causes the element to rotate and expose a second, different segment to the observer. A gyricon display maintains a given configuration until an electric field is actively applied to the display assembly. Gyricon particles typically have a diameter of about 100 microns. Gyricon materials are disclosed in U.S. Pat. Nos. 6,147,791, 4,126,854 and 6,055,091, the contents of which are herein incorporated by reference.

A reference electrode layer can be used in co conjunction with the electronic ink disposed upon a display medium and a backplane to form an electronically activatable and addressable electronic display. The electrode and backplane can be disposed on, or cover opposite sides of the microcapsule arrangement, or both to provide structure for creating a potential difference across the electronic ink that causes particles within the microcapsules to migrate toward one of the electrodes. This migration can change the color of the sphere, and hence the pixel location, as viewed by an individual. According to one practice, the microcapsules can be filled with electrically charged white particles in a black or colored dye. Examples of electronic ink and methods of fabricating assemblies capable of controlling or effecting the orientation of the ink suitable for use with the present invention are set forth in International Patent Application Publication Number WO 98/41899, International Patent Application Publication Number WO 98/19208, International Patent Application Publication Number WO 98/03896, and International Patent Application Publication Number WO 98/41898, the contents of which are herein incorporated by reference, The term electronic ink can also include a bi-stable non-volatile cholesteric imaging material. The cholesteric liquid crystal material has positive dielectric anisotropy and can include a chiral material in an amount effective to form focal conic and twisted planar textures. Typically cholesteric imaging material comprises liquid crystal cells ranging in thickness from about 25 microns to about 50 microns. Suitable cholesteric materials are disclosed for example in U.S. Pat. Nos. 6,154,190, 6,061,107 and 5,847,798, the contents of which are incorporated herein by reference.

In addition, the electronic ink can include zenithal bi-stable display technology to form the bi-stable nonvolatile display assembly comprised of a bi-stable nematic liquid crystal device cell. The bi-stable nematic cell is provided with a surface alignment grating on at least one cell wall and a surface treatment on an opposite cell wall. The material is activated by DC pulses to form an image. Suitable zenithal bi-stable devices are disclosed in U.S. Pat. No. 6,151,096, International Patent Application Publication Number WO 98/04953, International Patent Application Publication Number WO 99/34251A1, U.S. Pat. No. 6,054,973, International Patent Application Publication Number WO 00/52671, and U.S. Pat. No. 6,151,096, the contents of which are herein incorporated by reference.

Further the electronic ink can include a thermo-chromic material A thermo-chromic material is capable of changing its state alternately between transparent and opaque upon the application of heat. In this manner, a thermo-chromic imaging material develops images through the application of heat at specific pixel locations in order to form an image. The thermo-chromic imaging material retains a particular image until heat is again applied to the material. The display assembly is reusable, rewritable, non-volatile, bi-stable. Visually, black characters are written in a transparent background by applying heat to selected locations or pixels in the display layer. To form color displays other colors, such as red, yellow, and blue are used. Since the rewritable material is transparent, UV fluorescent printings, designs and patterns underneath can be seen through.

The electronic ink can also include surface stabilized ferroelectric liquid crystals (SSFLC). Surface stabilized ferroelectric liquid crystals confining ferroelectric liquid crystal material between closely-spaced glass plates to suppress the natural helix configuration of the crystals. The cells switch rapidly between two optically distinct, stable states simply by alternating the sign of an applied electric field.

Magnetic particles suspended in an emulsion comprise an additional imaging material suitable for use with the present invention. Application of a magnetic force alters pixels formed with the magnetic particles in order to create, update or change human readable indicia, machine readable indicia or both. Those skilled in the art will recognize that a variety of bi-stable non-volatile imaging materials are available and may be implemented in the present invention.

The RFID tag 300 of FIG. 3 and other embodiments disclosed herein may include other features, such as data logging, etc.

Figure 4:
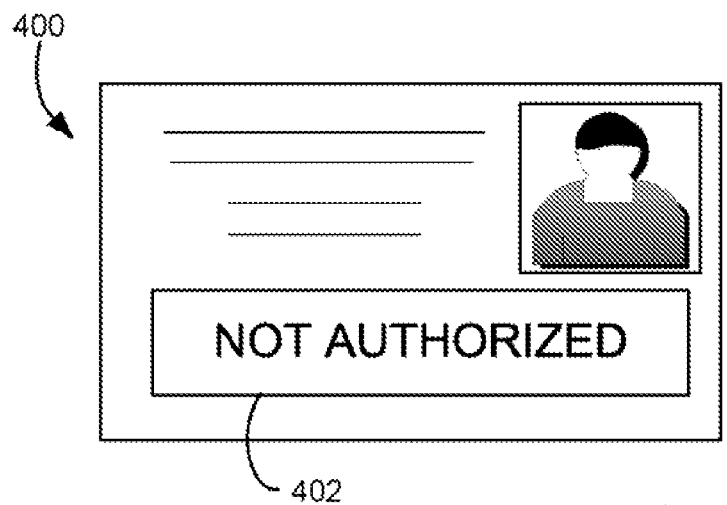
FIG. 4 is a side view of an RFID tag with a display device according to one embodiment of the present invention.

FIG. 4 illustrates a tag 400 that sets an alarm state upon detecting an exception. The tag 400 includes a visual display device 402. Upon the tag 400 detecting an exception-based alarm condition, an alarm state is set and the visual display device 402 is instructed or engaged to display a visual indicator of the alarm condition. For example, if the tag goes out of range of the reader, the lack of incoming signal creates an exception and the alarm state is set. Similarly, if the tag realizes it has passed by a reader without being detected (e.g., was shielded but now detects a signal), an alarm state can be set.

Figure 5A:
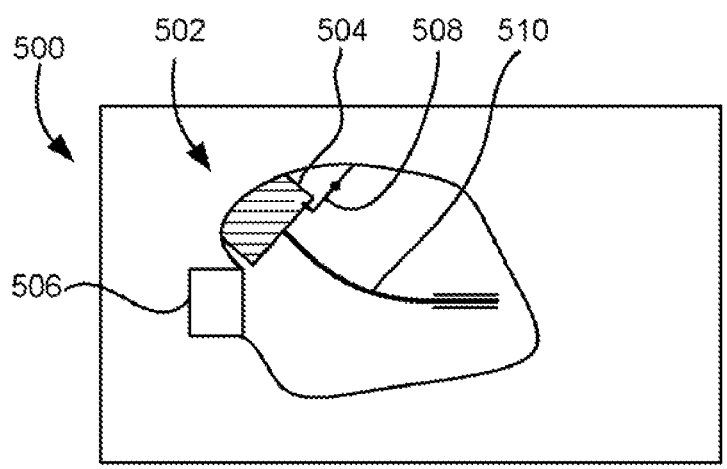
FIG. 5A is a partial breakaway view of an RFID tag with a mechanical display device according to one embodiment of the present invention.
Figure 5B:
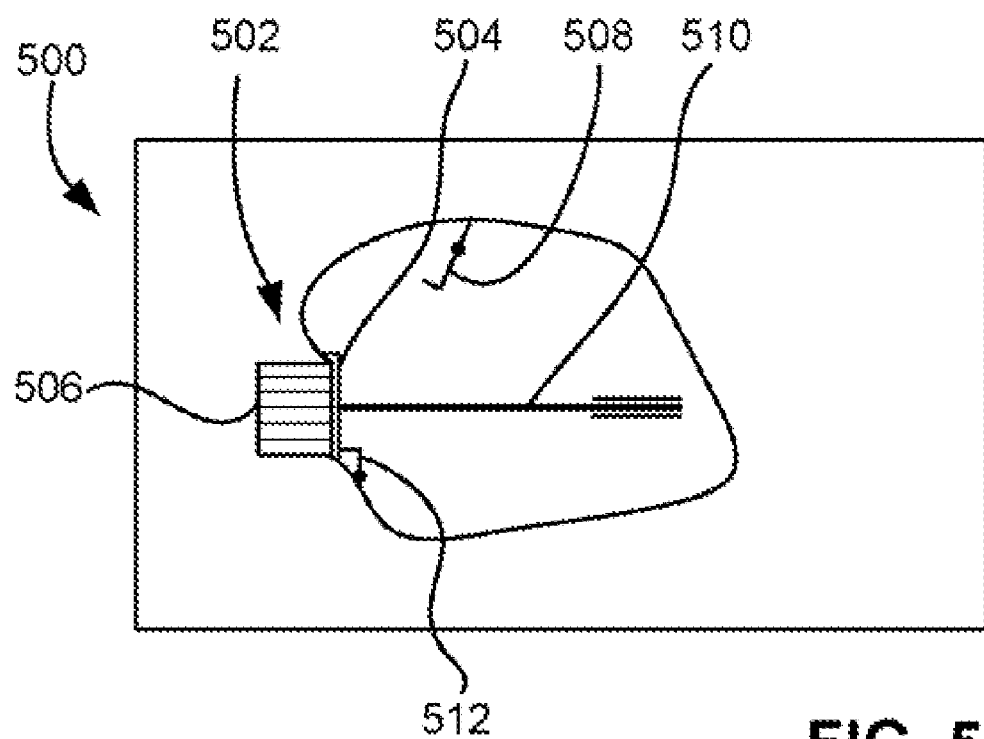
FIG. 5B is a partial breakaway view of an RFID tag with a mechanical display device indicating an alarm condition according to one embodiment of the present invention.

The visual display device may also include a mechanical device, which may include some electronic components but has a mechanical aspect. FIGS. 5A-5B illustrate a tag 500 where the visual display device 502 includes a mechanical flag 504. In the non-alarm state, shown in FIG. 5A, the mechanical flag 504 is retracted so that a particular color is shown in the window 506. As shown FIG. 5B, when the alarm flag is set, a trigger 508 releases the flag 504, which is carried into the window 506 via spring 510. The flag 504 changes the color viewed through the window. Preferable, the flag 504 can be mechanically reset e.g., by insertion of a tool through an opening, etc. To avoid tampering, the trigger 508 can remain retracted until the tag 500 is instructed to actuate the trigger 508. To further avoid tampering, the flag 504 may lock into place upon being released. A lock 512 may be provided for this purpose and may or may not be selectively releasable.

Figure 6:
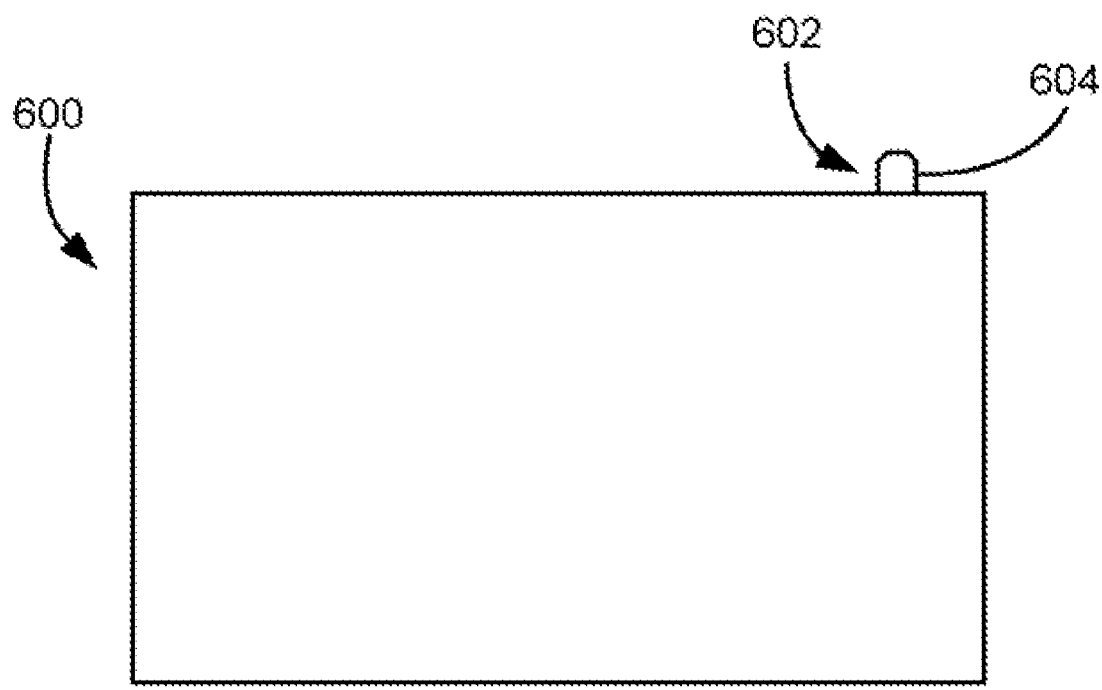
FIG. 6 is a side view of an RFID tag with a tactile indicator device indicating an alarm condition according to one embodiment of the present invention.

FIG. 6 illustrates a tag 600 having a tactile indicator 602 that indicates an alarm condition. The tactile indicator 602 in this embodiment includes a button 604 that pops out of the tag. The button 604 can then be felt by a user. The button 604 may also be visible, and may have a color different than that of the tag housing. The tactile indicator 602 may include a trigger and spring mechanism similar to that used in the illustrative tag 500 of FIGS. 5A-5B. Embodiments with tactile indicators are particularly useful for monitoring items or conditions where a direct line of sight to the tag is difficult, such as between boxes of goods, under pallets, inside pipes, etc. Note that the tactile indicator can be provided in addition to a visual device, or can replace it.

In additional embodiments, the alarm state is set by an interrogator upon the interrogator detecting an alarm condition, e.g., upon occurrence of some event. For example, if the interrogator detects an unauthorized ID badge, it may instruct that badge to set the alarm condition. In another embodiment, the interrogator sets an alarm state in each tag as it identifies each tag to indicate which tags have been read, are from a certain lot, are coupled to objects to be identified, etc.

For ease of understanding, much of the previous description has been presented in terms of visual and tactile indicators. It should be understood that the visual display device or tactile device can easily be replaced with an audible output device in any of the various possible combinations and permutations of the present invention. An audible output device can be any type of audible output device known in the art, such as a buzzer, speaker outputting a beep, etc. The audible device may provide similar functionality as the visual or tactile device, such as persistent output until reset, etc. Also, variations of the present invention may include combinations of the various types of output/indicator devices, multiples of the same type of output device, etc.

Figure 7:
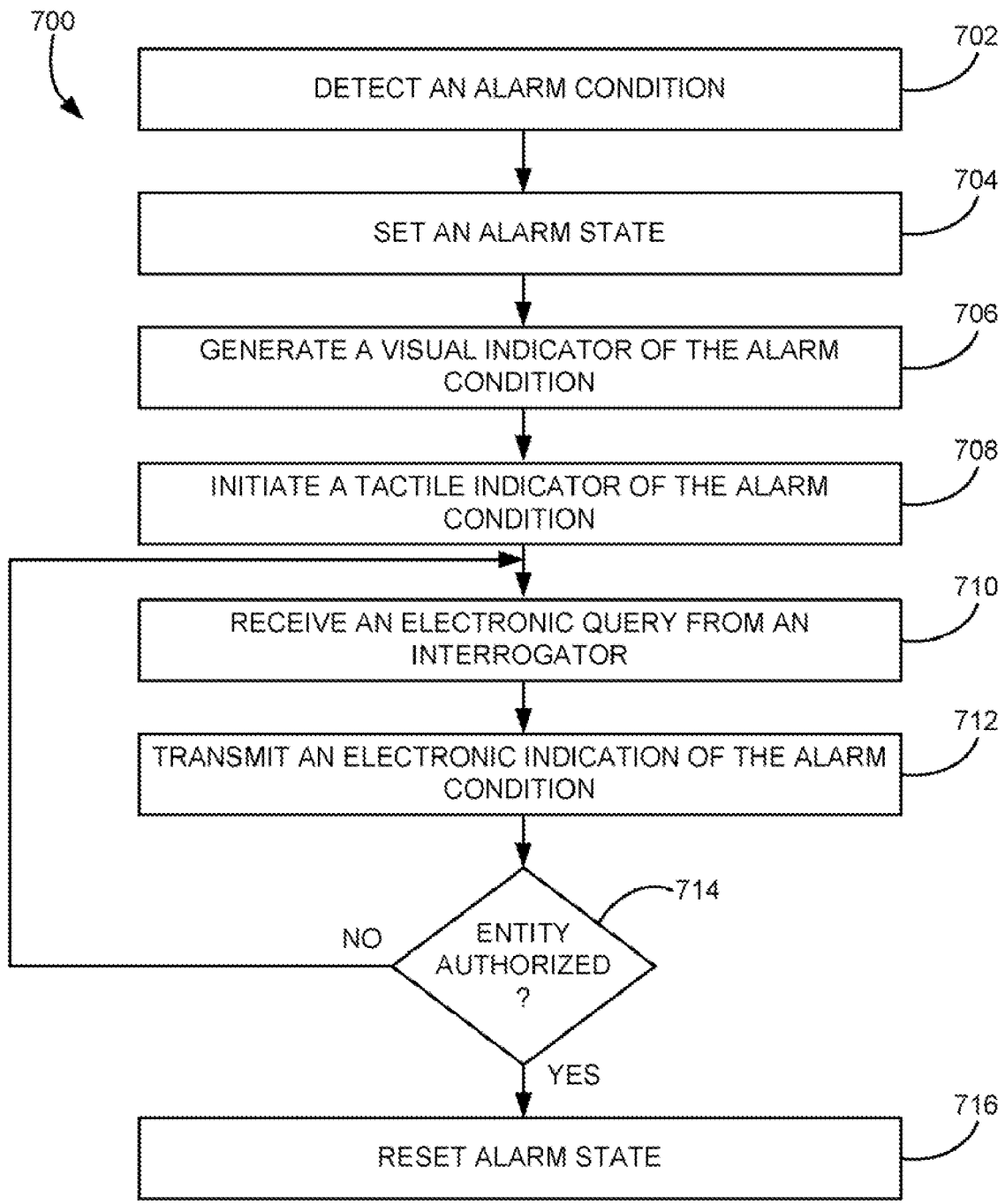
FIG. 7 is a process diagram of a method for visually and electronically indicating occurrence of an alarm condition according to one embodiment of the present invention.

FIG. 7 graphically depicts an illustrative method 700 for visually and electronically indicating occurrence of an alarm condition. In operation 702, an alarm condition is detected. This operation may be performed by the tag, the interrogator, or both. An alarm state is set upon detecting the alarm condition in operation 704. In operation 706, a visual indicator of the alarm condition is generated. In optional or alternative operation 708, a tactile indicator is also initiated. At this point, a user can see or feel that an alarm condition has occurred or is occurring.

In operation 710, an electronic query is received from an RFID interrogator. An electronic indication of the alarm condition is transmitted to the interrogator in operation 712. The visual and/or tactile indicator of the alarm condition can only be reset by an authorized entity. Accordingly, in operation 714, authorization of the entity is verified. If the entity is authorized, the alarm state is reset in operation 716. The indicator may then reflect or be reset to a non-alarm condition. If the entity is not authorized, the alarm state is not reset and the visual and/or tactile indicator remain in the alarm state.

In a variation, the tag may also transmit the electronic indication of the alarm condition to the interrogator without having first received a query from the interrogator.

Figure 8:
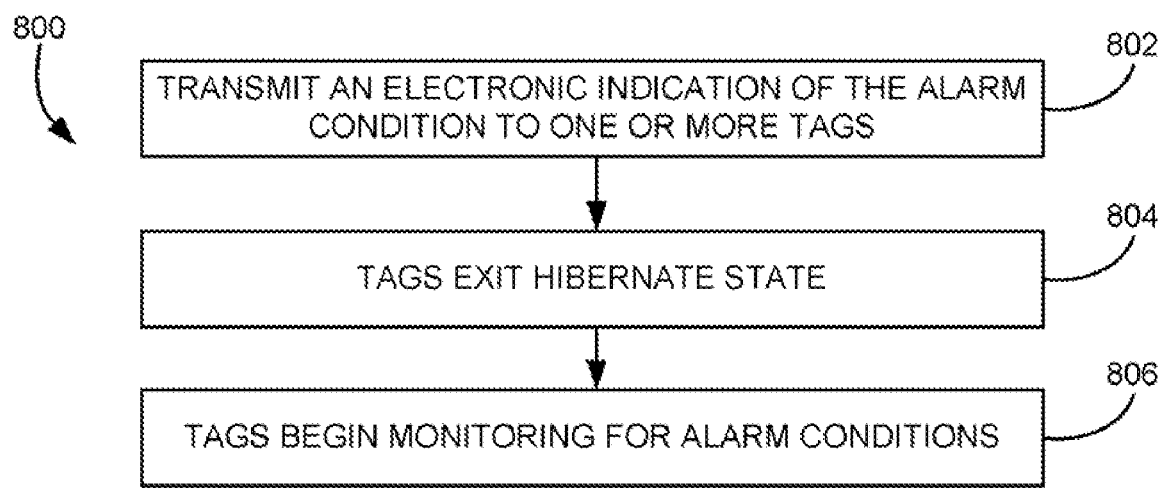
FIG. 8 is a process diagram of a method for activating one or more RFID tags upon occurrence of an alarm condition according to one embodiment of the present invention.

FIG. 8 depicts a method 800 for activating other RFID tags on occurrence of an alarm condition. In operation 802, a master tag transmits an electronic indication of an alarm condition to one or more other tags. This transmission may include an activate command to bring the other tags out of a hibernate state. The transmission may include a simple instruction to begin monitoring. The transmission may also include the nature of the alarm condition, as well as parameters for detecting alarm conditions by the various other tags. In operation 804, the other tag(s) come out of a hibernate state, and in operation 806, begin monitoring for alarm condition (which may or may not be the same as the first alarm condition). Note that a transmission is meant to include a series of transmissions between the tags, with possible transmissions to and from an interrogator. For example, in a variation, the master tag might transmit the indicator of the alarm condition to the interrogator, and the interrogator wakes the other tags. Also, the master tag and/or other tags may or may not have a visual display device or tactile device thereon.

Figure 9:
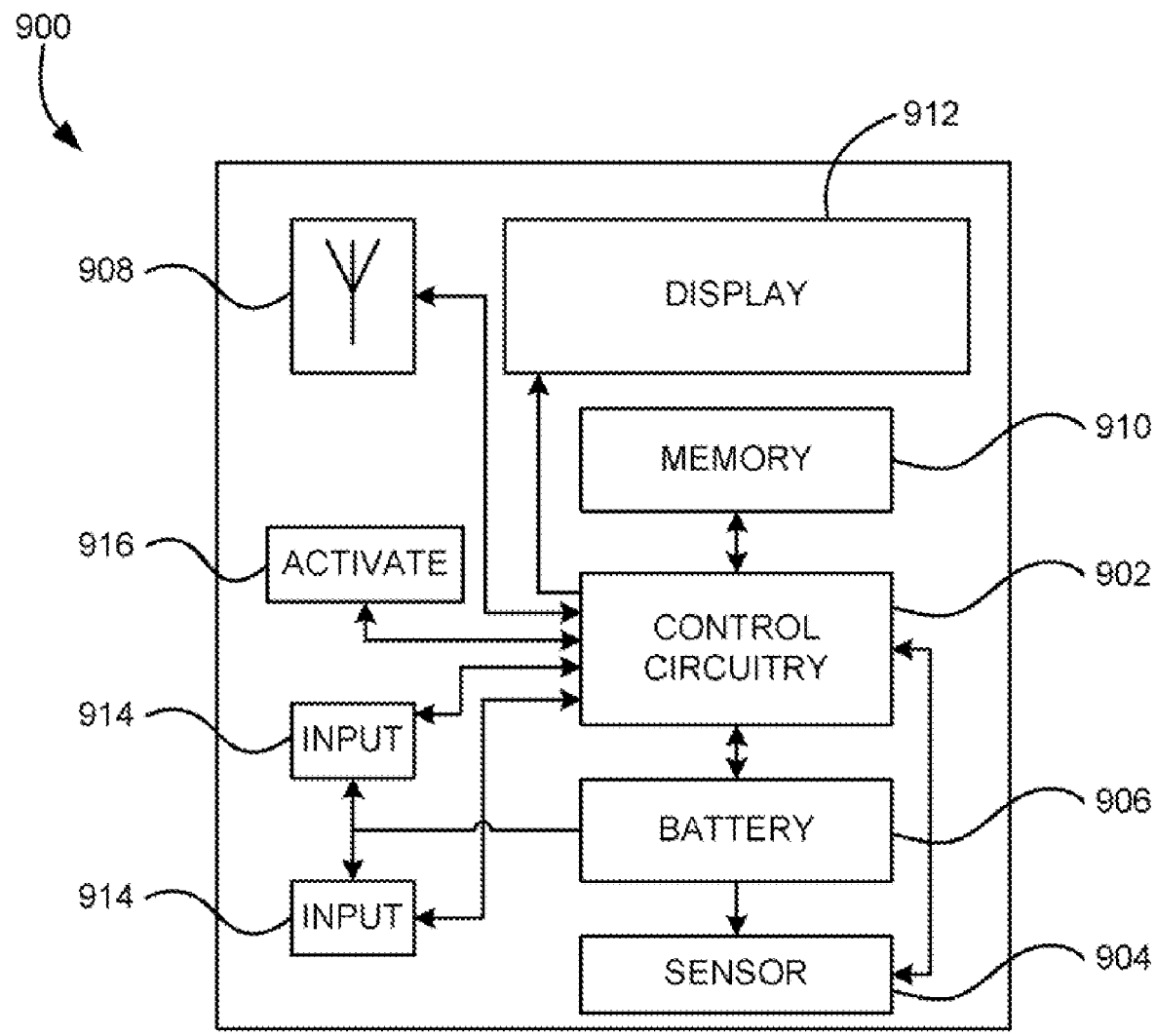
FIG. 9 is a system diagram of an RFID tag having a sensor and manual user input devices according to one embodiment of the present invention.

FIG. 9 illustrates an RFID tag 900 according to another embodiment of the present invention. As shown, the tag 900 includes a controller 902, a sensor 904 in communication with the controller 902, a local power source, e.g., battery, 906 for providing power to the controller 902, an antenna 908 in communication with the controller 902, memory 910 in communication with the controller, a display device 912, and one or more user input devices 914 for receiving manual input from a user. The controller 902, sensor 904, a local power source 906, antenna 908, memory 910, and display device 912 can be similar or identical to those described above, and some of which may be integrated into the same chip as the controller.

A function of the tag 900 is selectable by manipulation of the user input device(s) 914. For instance, in some embodiments, the tag 900 (or portion thereof) can be manually started by the user via the user input device(s) 914. This encompasses not only initializing a completely powered-down tag 900, but more likely, waking the tag 900 from a low power hibernate state into an active state e.g., battery powered state.

As described above, a portion of the tag circuitry may normally be in a hibernate state in order to conserve battery power. To that end, the tag 900 may include activate circuitry 916 as a separate module or integrated into the controller 902. The activate circuitry 916 detects a valid activate command in an incoming RF signal and causing the tag 900 to wake from a hibernate state. Because the user may not always have an interrogator present, manipulation of the user input device may also cause the controller 902 to wake from the hibernate state, either via the activate circuitry 916 or other mechanism. Once the tag 900 is awakened, other functions become accessible, such as manually requesting a sensor 904 reading via the user input device(s) 914.

To maximize power conservation, the activate circuitry 916 may be in a powered down initial state, where a signal from a user input device causes initialization of at least the activate circuitry 916. Active and semi-passive tags do not have infinite battery life. Rather, the life of the battery will depend on many things, including when the tag 900 was first powered, the amount of time that the tag 900 is active, which functions the tag 900 is performing and how frequently, etc. Typically, when the tag 900 is manufactured, the tag 900 is immediately activated, optionally programmed with an EPC, and placed into a hibernate mode. Thereafter, battery power is constantly being drawn to power the activate circuitry 916, which monitors incoming signals for a valid activate command. To maximize the life of the tag 900, it may be desirable to completely depower the tag 900 after manufacture and optional initial programming, and later initialize the activate circuitry 916 when the tag 900 is ready to enter service. One embodiment of the present invention is a tag 900 that is completely powered down. Then, upon receiving a manual user input, at least the activate circuitry 916 is initialized so that an interrogator can communicate with the tag 900. The activate circuitry 916 on the tag 900 may remain active thereafter, powering down again only upon receiving a valid instruction to do so from an interrogator or via user input. Preferably, whether the instruction is valid depends on a security scheme, e.g., using a code or password stored in the tag. 900, and which is compared to an incoming (wirelessly or manually entered) code or password.

Many functions may be initiated by manipulation of the user input device(s) 914. One such function is taking a one-time reading by the sensor 904. This is useful, for example, where the scheduled sensor 904 reading interval is large, and the user wants to take a manual reading. Typically, the Another manually selectable function is requesting output of a reading of the sensor 904, such as a current reading, a maximum reading or a minimum reading of the sensor 904. Similarly, the function may be causing output of a historical compilation based on readings of the sensor 904.

In manual mode, the user can manually select from a subset of pre-programmed modes using the user input device(s) 914. For instance, the user input device(s) 914 may toggle initialization of the sensor 904 and/or a data gathering mode. A further function is alteration of parameters of such a mode. For instance, the user input device(s) 914 can be used to set parameters of the sensors 904 in a data gathering mode, such as setting upper and lower alarm condition limits on whatever is being monitored by the sensor 904.

Preferably, the tag 900 includes a visual or audible mechanism for indicating which function or mode the user is starting. In the embodiment shown in FIG. 9, the tag 900 has a display device 912. The display device 912 can output alphanumeric indication of which mode the user is in. The display device 912 can also output data stored in memory 910, e.g., sensor 904 readings. If the display device 912 is merely a flashing light, the tag 900 can flash the light each time the mode changes. If no display device 912 is present, the tag 900 may include a device for generating audible tone, such that a tone is emitted each time the mode changes. Sequences of flashes or tones can also indicate which mode is currently selected or active. For example one flash or beep indicates the tag 900 is operating in a first mode, two flashes or beeps indicates that the tag 900 is operating in a second mode, and so on.

Data stored on the tag 900 may be displayed upon manipulation of the user input device(s) 914. As noted above, high and low sensor 904 readings can be displayed, as well as historical values. Other information stored in the memory 910 can also be displayed, such as the tag ID, product ownership information, etc. Note that access to some data stored on the tag 900 may be limited when a user accesses the data manually (e.g., a reader is not present). A pass code may be required to access some data. The pass code can be entered via the user input device(s) 914.

The display device 912 may further provide a visual indicator of occurrence of an alarm condition, as discussed in detail above. Some embodiments may allow the user to set alarm condition settings manually. If so, a security mechanism should be implemented such as requiring a user to enter a password to change alarm condition settings. The security mechanism prevents tampering with the alarm condition settings. An example of tampering is raising a maximum allowable temperature setting to above an acceptable limit during part of a transportation process in order to ensure that the alarm condition never occurs. However, other functions, such as reviewing sensor 904 readings, requesting additional sensor 904 readings, viewing identification information, etc. may be allowed without security.

Illustrative user input devices 914 include buttons, wheels, keys, levers, etc. and combinations thereof. As one example, assume the tag 900 has only one button, which allows selection of a mode of operation. Modes are selected by pressing the single button repeatedly until the desired mode is reached. Which mode is currently selected can be displayed on the display device 912 of the tag 900, for example. Further, parameters of a particular mode can be manipulated by selecting a desired mode, then holding down the button to enter a configuration mode. As another example, assume the tag 900 has two buttons. Depressing either button wakes the tag 900. Then, three modes can be selected by pressing the first button and not the second button, the second button and not the first button, and both buttons together. Alternatively, the buttons can allow scrolling between selectable modes or instructions on the display device 912, or one button may scroll forward through display items and the other button selects the mode or instruction being displayed. One skilled in the art will appreciate that more or different user input devices may be present, and these examples only describe a few of the many possible methods of receiving user input.

Also contemplated is a detachable hardwired connection to a sensor or computing device for communication with a tag.

Figure 10:
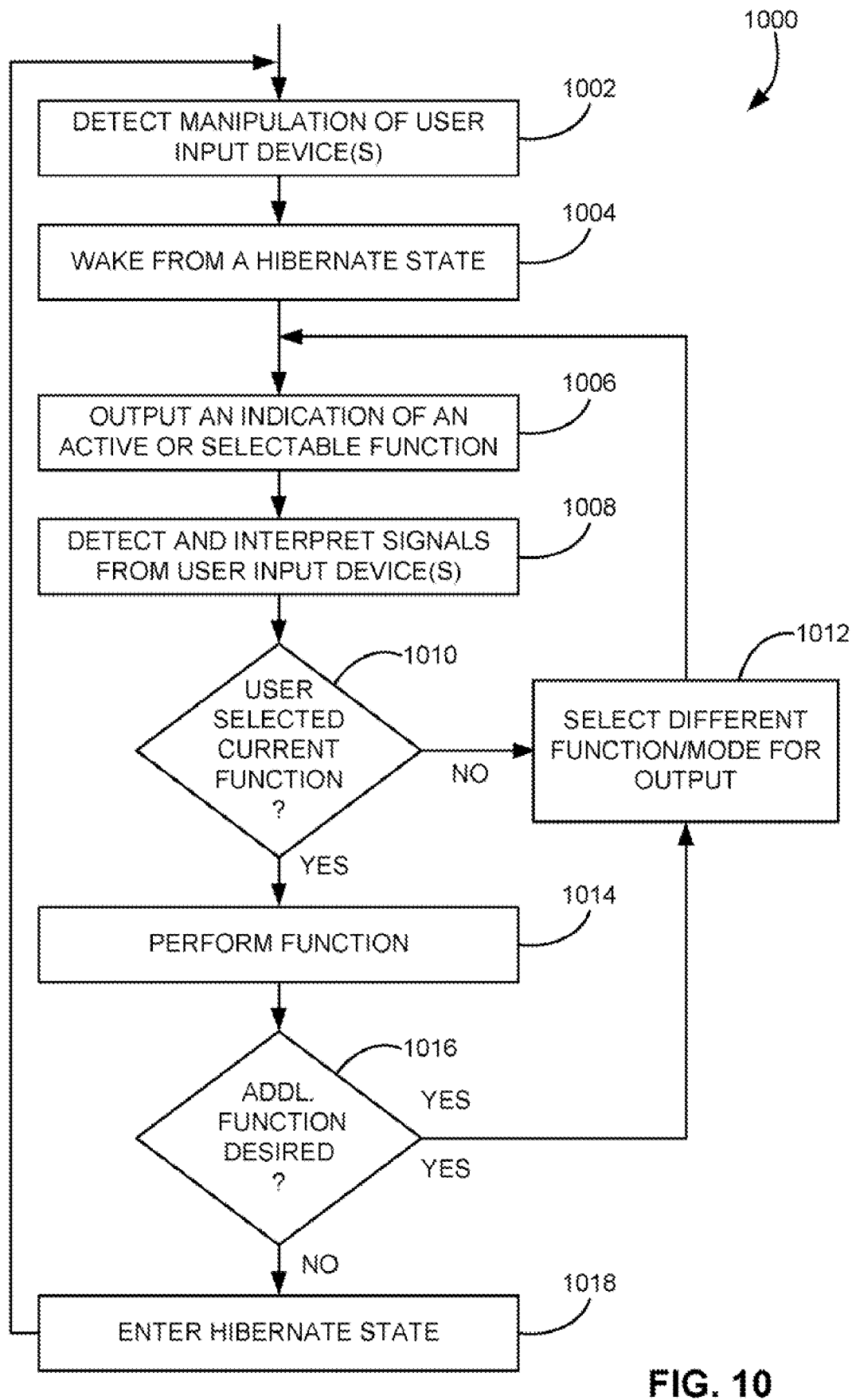
FIG. 10 is a process diagram of a method for performing a function, such as taking a sensor reading, upon receiving manual user input according to one embodiment of the present invention.

FIG. 10 illustrates a method 1000 for performing a function, such as taking a sensor reading, upon receiving manual user input according to one embodiment of the present invention. In operation 1002, manipulation of a user input device is detected. The tag is awakened from a hibernate mode in operation 1004. In other words, certain circuitry of the tag is energized and initiated. In operation 1006, a display device outputs an indication of a currently active or selectable function or mode. In operation 1008, signals from the user input device is detected. The signals from the user input device are interpreted to determine whether the currently-output function has been selected by the user at decision 1010. If not, an indication of a different function or mode is selected for output in operation 1012, and operations 1006-1010 are repeated. When the currently-output function is selected by the user, the function is performed in operation 1014. One illustrative function is taking a sensor reading. Another is outputting a reading of the sensor. At decision 1016, a determination is made as to whether additional functions are desired. For instance, receiving additional user input may indicate that further functions are desired. On the contrary, user input or lack thereof for a predetermined period of time, e.g., 20 seconds, may indicate that no additional functions are desired. If no additional functions are desired, the tag reverts to a hibernate state in operation 1018. If additional functions are desired, the process returns to operation 1012.

To place the various aspects of the invention in context, several nonlimiting examples are provided below.

EXAMPLE

A tag is coupled to a case of frozen meat. The tag includes a temperature sensor and an alarm as described herein. During shipment of the meat, the tag records a temperature profile of the temperature in the case. Readings can be taken at any desired interval from seconds to days, e.g., every 15 minutes, every hour, every three hours, etc. The frequency, of course, may depend on user preference, the sensitivity of the item(s) being monitored, the susceptibility to temperature change, etc. For example, frozen goods temperature does not change very rapidly in at dense and packed environment, and so longer intervals may be suitable.

Continuing with the example, if the temperature goes outside a preset range, such as above a maximum temperature or below a certain temperature to prevent thawing or freezer burn and hence guarantee good quality of meat, a flag is set and the visual alarm is engaged, The visual indicator allows people to quickly verify whether the goods have been damaged without requiring that a tag reader be present. If the temperature of the case of meat has exceeded the maximum value, the visual alarm will indicate that the recipient should reject the meat, or at least review the temperature profile stored on the tag prior to accepting the product.

EXAMPLE

A blood bag is being transported from a blood bank to a hospital. A tag is attached to the blood bag, and programmed to set an alarm state if the blood bag exceeds 50 degrees F. for a period of 5 minutes. If the blood bag exceeds 50 degrees F., a stripe on the tag changes color from blank to red. "Blank" refers to a default color and can be any color. For the present description, assume blank is black. The visual indicator allows people to quickly verify whether the blood has been damaged without requiring that a tag reader be present.

EXAMPLE

A rack of wine is stored in a cellar. A tag is attached to the rack of wine, and programmed to set an alarm state if the UV light in the cellar reaches a cumulative amount since the tag was placed, e.g., 5 million photons. If the cellar exceeds the threshold, the alarm condition flag is set and a visual indicator is displayed, e.g., a stripe on the tag changes color from green to red.

EXAMPLE

Assume three people pass into a restricted area. Person A is authorized to enter the restricted area and is wearing his ID tag clipped to his shirt, person B is not authorized to enter the restricted area and is wearing her ID tag clipped to her shirt, and person C is not authorized to enter the restricted area and has placed her ID tag in a metal container to shield it from the reader. All of the ID tags are normally blank, revert to blank after a certain time has elapsed, or revert to blank upon receiving an authorized instruction to do so. When person A passes through the entry door, the reader at the door verifies the tag identity as being associated with an authorized user and instructs person A's ID tag to show a green stripe. When person B passes through the entry door, the reader recognizes the unauthorized entry and instructs her ID tag to show a red stripe. When person C passes through the entry door, the reader does not detect the shielded tag. Person C's tag thus remains blank. By looking at each person's ID tag, a security guard can quickly recognize that persons B and C have not been cleared to enter the restricted area and can take appropriate action. Because person C's tag is blank, the guard may not know whether the ID tag is defective or has been shielded. The guard can then either scan the ID tag with a portable reader, or escort person C back to the entry for rescanning. Likewise, when person B leaves the area, the red stripe may remain, requiring person B to notify security in order to reset the stripe, and explain her unauthorized entry.

EXAMPLE

During a read process, the tags that have been read are set to the alarm state and so display a visual indicator. Those not yet read do not display a visual indicator.

EXAMPLE

A tag having a moisture sensor and a tactile indicator is coupled to the underside of a wood pallet. The pallet is then loaded with cases of products. The tag is programmed to set an alarm state if the moisture sensor gets wet. When water is splashed on or rises to the level of the moisture sensor, the alarm flag is set and the tactile indicator extends from the tag. A user reaches under the pallet and touches the tag to feel if the tactile indicator is extended. If so, at least the bottom of the pallet was in contact with water.

EXAMPLE

A master tag having a temperature sensor is placed on the outside of a pallet stacked with goods. Tags having temperature sensors are coupled to cases of items on the pallet. The master tag is programmed to set an alarm state if the ambient temperature exceeds a threshold. When temperature exceeds the threshold, the master tag alarm flag is set and an activate command is sent to the tags on the pallet. The tags wake up and begin monitoring a temperature profile of the object to which attached or its environment.

EXAMPLE

An item in a refrigerated room is tagged with an RFID tag having a temperature sensor. The tag is preprogrammed to wake from a hibernate state to take a temperature reading every 30 minutes. Days later, a user wants to observe a historical temperature profile of the tagged item in the refrigerated room. The user does not have a reader handy, so he manipulates user input devices to view current status, historical temperature profile, interval between readings, etc.

EXAMPLE

Continuing from the previous example, assume the user notes a spike in temperature. Because the readings are only taken each 30 minutes, the user is not sure the highest recorded temperature reflects the highest temperature in the refrigerated room. Accordingly, the user wants temperature readings to be taken more frequently. The user manipulates the user input devices until "temp. reading interval" is displayed on the screen. The user then further manipulates the user input devices to reduce the interval between readings to 10 minutes.

EXAMPLE

A tag is coupled to a case of temperature-sensitive goods being shipped across the country in a refrigerated truck. The track arrives at its destination, a small grocery store. Before accepting the goods, the grocery store employee in charge of receiving the goods wants to verify that the case of goods did not exceed a preset threshold temperature. The employee does not have an RFID reader handy, and so the employee manipulates the user input devices on the tag to retrieve the maximum and minimum temperatures of the case (or its environment) during transportation. The employee can also review and verify the upper and lower temperature thresholds programmed into the tag. In this way, the user need not have an operating interrogator in hand to determine whether to accept or reject the goods. Note also that the truck driver can also check the temperature profile of the goods prior to accepting them on his truck, as well as anytime during shipment.

One skilled in the art will appreciate how the systems and methods presented herein can be applied to a plethora of scenarios, venues and goods. Accordingly, it should be understood that the systems and methods disclosed herein may be used with objects of any type and quantity in virtually any location.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) tag, comprising:

a controller of the RFID tag;

a sensor in communication with the controller;

a local power source for providing power to the controller; and a user input device for receiving manual input from a user, wherein at least a portion of the controller is normally in a low power hibernate state, wherein manipulation of the user input device causes the at least a portion of the controller to wake from the hibernate state, wherein a function is selectable by manipulation of the user input device, wherein the function selectable by manipulation of the user input device is a reading by the sensor; and further comprising activate circuitry in communication with the controller of the RFID tag for detecting a valid activate command in an incoming radio frequency signal and causing the RFID tag to wake from the hibernate state, and wherein further functions selectable by manipulation of the user input device further include at least one of outputting a historical compilation based on readings of the sensor, initiating a data gathering mode using the sensor where the data gathering mode includes taking multiple sensor readings with predetermined intervals therebetween without requiring further user input to take said readings, and altering parameters of the data gathering mode using the sensor.

2. A Radio Frequency Identification (RFID) tag, comprising:
   a controller of the RFID tag;
   a local power source for providing power to the controller; and
   a user input device for receiving manual input from a user,
   wherein at least a portion of the controller is normally in a hibernate state, wherein manipulation of the user input device causes the at least a portion of the controller to wake from the hibernate state,
   wherein a function is selectable by manipulation of the user input device,
   wherein the function sets a future action to occur after a predetermined period of time has elapsed.

3. A Radio Frequency Identification (RFID) tag, comprising:
   a controller of the RFID tag;
   a sensor in communication with the controller;
   a local power source for providing power to the controller; and
   a user input device for receiving manual input from a user,
   wherein at least a portion of the controller is normally in a hibernate state, wherein manipulation of the user input device causes the at least a portion of the controller to wake from the hibernate state,
   wherein a function is selectable by manipulation of the user input device,
   wherein the function selectable by manipulation of the user input device is setting of an interval between sensor readings,
   wherein the controller exits the hibernate state without user input during the readings.

4. The RFID tag as recited in claim 3, wherein the reading of the sensor is selected from a group consisting of a current reading, a maximum reading and a minimum reading of the sensor.

5. A Radio Frequency Identification (RFID) tag, comprising:
   a controller of the RFID tag;
   a sensor in communication with the controller;
   a local power source for providing power to the controller; and
   a user input device for receiving manual input from a user,
   wherein at least a portion of the controller is normally in a hibernate state, wherein manipulation of the user input device causes the at least a portion of the controller to wake from the hibernate state,
   wherein a function is selectable by manipulation of the user input device,
   wherein the function selectable by manipulation of the user input device is output of a historical compilation based on readings of the sensor.

6. A Radio Frequency Identification (RFID) tag, comprising:
   a controller of the RFID tag;
   a sensor in communication with the controller;
   a local power source for providing power to the controller; and
   a user input device for receiving manual input from a user,
   wherein at least a portion of the controller is normally in a hibernate state, wherein manipulation of the user input device causes the at least a portion of the controller to wake from the hibernate state,
   wherein a function is selectable by manipulation of the user input device,
   wherein the function selectable by manipulation of the user input device is initiating a data gathering mode using the sensor, the data gathering mode comprising taking sensor readings at predetermined intervals without requiring further user input.

7. A Radio Frequency Identification (RFID) tag, comprising:
   a controller of the RFID tag;
   a sensor in communication with the controller;
   a local power source for providing power to the controller; and
   a user input device for receiving manual input from a user,
   wherein at least a portion of the controller is normally in a hibernate state, wherein manipulation of the user input device causes the at least a portion of the controller to wake from the hibernate state,
   wherein a function is selectable by manipulation of the user input device,
   wherein the function selectable by manipulation of the user input device is alteration of parameters of a data gathering mode using the sensor, the data gathering mode comprising taking sensor readings at predetermined intervals without requiring further user input.

8. A Radio Frequency Identification (RFID) tag, comprising:
   a controller of the RFID tag;
   a sensor in communication with the controller;
   a local power source for providing power to the controller; and
   a user input device for receiving manual input from a user,
   wherein at least a portion of the controller is normally in a low power hibernate state, wherein manipulation of the user input device causes at least a portion of the controller to wake from the hibernate state,
   wherein a function is selectable by manipulation of the user input device,
   wherein the function selectable by manipulation of the user input device is a reading by the sensor, and
   wherein another function selectable by manipulation of the user input device is selection of a mode of operation of the tag.

9. The RFID tag as recited in claim 8, further comprising an electronic display device in communication with the controller.

10. The RFID tag as recited in claim 9, wherein the electronic display device provides a visual indicator of occurrence of an alarm condition.

11. The RFID tag as recited in claim 8, further comprising activate circuitry, the activate circuitry being for detecting a valid activate command in an incoming radio frequency signal and causing the at least a portion of the controller to wake from the hibernate state.

12. The RFID tag as recited in claim 8, further comprising non-volatile memory, wherein the non-volatile memory has sufficient capacity to store several sensor readings.

13. The RFID tag as recited in claim 12, wherein the non-volatile memory also has sufficient capacity to be used in processing functions of the controller.

14. An RF1D system, comprising:
   a plurality of RFID tags as recited in claim 8; and
   an RFID interrogator in communication with the RFID tags.

15. The RFID tag as recited in claim 8, wherein the sensor detects at least one of an environmental condition and a condition of an object to which attached, the sensor taking readings at predetermined intervals, the sensor also taking a manual reading upon manipulation of the user input device.

16. The RFID tag as recited in claim 15, wherein the sensor detects an environmental condition, wherein the environmental condition is selected from a group consisting of temperature, humidity, Ph, sunlight, ultraviolet light, chemicals, radioactivity, pathogens, presence of bacteria, presence of viruses, presence of prions, carbon dioxide level, and combinations thereof.

17. The RFID tag as recited in claim 8, wherein a function selectable by manipulation of the user input device is dependent upon a present state of the tag.

18. The RFID tag as recited in claim 8, wherein indicia of available modes of operation of the tag are displayed on a display device, the modes being selectable using the user input device.

19. A Radio Frequency Identification (RFID) tag, comprising:
a controller of the RFID tag;
a sensor in communication with the controller;
a local power source for providing power to the controller;
a user input device for receiving manual input from a user; and
an electronic display device in communication with the controller,
wherein at least a portion of the controller is normally in a low power hibernate state, wherein manipulation of the user input device causes at least a portion of the controller to wake from the hibernate state,
wherein a function is selectable by manipulation of the user input device,
wherein the function selectable by manipulation of the user input device is a reading by the sensor, and
wherein indicia of available modes of operation of the tag are displayed on the electronic display device, the modes being selectable using the user input device.

20. The RFID tag as recited in claim 19, wherein the function selectable by manipulation of the user input device is dependent upon a present state of the tag.

21. The RFID tag as recited in claim 19, wherein the tag is normally in the hibernate state, wherein manipulation of the user input device wakes the tag from the hibernate state.

22. An RFID system, comprising:
a plurality of RFID tags as recited in claim 19; and
an RFID interrogator in communication with the RFID tags.

23. A Radio Frequency Identification (RFID) tag, comprising:
a controller of the RFID tag;
a sensor in communication with the controller;
a local power source for providing power to the controller;
a user input device for receiving manual input from a user; and
activate circuitry, the activate circuitry being for detecting a valid activate command in an incoming radio frequency signal and causing the tag to wake from a low power hibernate state,
wherein at least a portion of the controller is normally in the low power hibernate state, wherein manipulation of the user input device causes at least a portion of the controller to wake from the hibernate state,
wherein a function is selectable by manipulation of the user input device,
wherein the function selectable by manipulation of the user input device is a reading by the sensor, and wherein the activate circuitry is in a powered down initial state, wherein a signal from the user input device causes initialization of at least the activate circuitry.

24. The RFID tag as recited in claim 23, wherein indicia of available modes of operation of the tag are displayed on a display device, the modes being selectable using the user input device.

25. A Radio Frequency Identification (RFID) tag, comprising:
a controller having activate circuitry, the activate circuitry being for detecting a valid activate command in an incoming signal and causing the tag to wake from a hibernate state;
an electronic display device in communication with the controller;
a local power source for providing power to the controller;
a user input device; and
a sensor in communication with the controller, wherein the sensor takes a reading upon manipulation of the user input device
wherein the tag is normally in the hibernate state,
wherein multiple functions are selectable by manipulation of the user input device,
wherein a function selectable by manipulation of the user input device at a given time is dependent upon a state of the tag at that time,
wherein manipulation of the user input device wakes the tag from the hibernate state.

26. The RFID tag as recited in claim 25, wherein the sensor detects an environmental condition, the sensor taking a reading upon manipulation of the user input device.

27. The RFID tag as recited in claim 26, wherein the environmental condition is selected from a group consisting of temperature, humidity, Ph, sunlight, ultraviolet light, chemicals, radioactivity, pathogens, presence of bacteria, presence of viruses, presence of prions, carbon dioxide level, and combinations thereof.

28. The RFID tag as recited in claim 25, wherein the sensor detects a condition of an object to which attached, the sensor taking a reading upon manipulation of the user input device.

29. The RFID tag as recited in claim 25, wherein manipulation of the user input device causes output of a reading of the sensor on the display device.

30. The RFID tag as recited in claim 29, wherein the reading of the sensor is selected from a group consisting of a current reading, a maximum reading and a minimum reading of the sensor.

31. The RFID tag as recited in claim 25, wherein manipulation of the user input device causes output on the display device of a historical compilation based on readings of the sensor.

32. The RFID tag as recited in claim 25, wherein manipulation of the user input device initiates a data gathering mode using the sensor.

33. The RFID tag as recited in claim 25,
wherein the activate circuitry is in a powered down initial state and manipulation of the user input device causes initialization of at least the activate circuitry,
wherein manipulation of the user input device further selects at least two functions selected from a list comprising: powering up of the sensor, taking a reading by the sensor, outputting a reading of the sensor, outputting a historical compilation based on readings of the sensor, initiating a data gathering mode using the sensor, altering at least one parameter of a data gathering mode using the sensor, wherein the electronic display device outputs a visual indication of the function or the functions being performed at any given time.

34. The RFID tag as recited in claim 25, further comprising non-volatile memory, wherein the non-volatile memory has sufficient capacity to store several sensor readings.

35. The RFID tag as recited in claim 34, wherein the non-volatile memory also has sufficient capacity to be used in processing functions of the controller.

36. A Radio Frequency Identification (RFID) tag, comprising:
   a controller having activate circuitry, the activate circuitry being for detecting a valid activate command in an incoming signal and causing the tag to wake from a hibernate state;
   an electronic display device in communication with the controller;
   a local power source for providing power to the controller; and
   a user input device,
   wherein the tag is normally in the hibernate state;
   wherein manipulation of the user input device wakes the tag from the hibernate state,
   wherein the electronic display device outputs a visible indication in direct response to the manipulation of the user input device,
   wherein a mode of operation of the tag is selected by manipulation of the user input device, wherein the electronic display device outputs a mode indication of the mode selected by the manipulation of the user input device.

37. The RFID tag as recited in claim 36, wherein indicia of available modes of operation of the tag are displayed on the display device.

38. A Radio Frequency Identification (RFID) tag, comprising:
   a controller having activate circuitry, the activate circuitry being for detecting a valid activate command in an incoming signal and causing the tag to wake from a hibernate state;
   an electronic display device in communication with the controller;
   a local power source for providing power to the controller; and
   a user input device,
   wherein the tag is normally in the hibernate state,
   wherein manipulation of the user input device wakes the tag from the hibernate state,
   wherein the electronic display device outputs a visible indication in direct response to the manipulation of the user input device,
   wherein the activate circuitry is in a powered down initial state, wherein a signal from the user input device causes initialization of at least the activate circuitry.

39. The RFID tag as recited in claim 38, wherein the electronic display device provides a visual indicator of occurrence of an alarm condition.

40. An RFID system, comprising:
   a plurality of RFID tags as recited in claim 38; and
   an RFID interrogator in communication with the RFID tags.

41. A method for taking a sensor reading upon receiving manual user input, the method comprising:
   detecting manipulation of a user input device of a Radio Frequency Identification (RFID) tag; and
   taking a sensor reading upon detecting the manipulation of the user input device,
   wherein at least a portion of a controller is normally in a low power hibernate state, wherein manipulation of a user input device causes at least a portion of the controller to wake from the hibernate state to take the sensor reading,
   wherein the controller exits the hibernate state without user input to take additional sensor readings.

42. The method as recited in claim 41, further comprising displaying a representation of the reading of the sensor.

43. The method as recited in claim 41, further comprising changing parameters of a sensor mode based on the detected manipulation of the user input.

44. A Radio Frequency Identification (RFID) system, comprising:
   a plurality of RFID tags, each tag performing the method of claim 41; and
   an RFID interrogator in communication with the RFID tags.

45. An RFID system, comprising:
   a plurality of RFID tags, each tag performing the method of claim 41; and
   an RFID interrogator in communication with the RFID tags.

46. A method for taking a sensor reading on a Radio Frequency Identification (RFID) tag upon receiving manual user input, the method comprising:
   detecting manipulation of a user input device of the RFID tag; and
   taking a sensor reading a predetermined period after detecting the manipulation of the user input device,
   wherein a sensor reading output is selected from a group consisting of a current reading, a maximum reading and a minimum reading of the sensor, wherein the tag enters a hibernate state between detecting the manipulation and taking the sensor reading.

47. An RFID system, comprising:
   a plurality of RFID tags, each tag performing the following method:
      detecting manipulation of a user input device, wherein indicia of available modes of operation of the tag are displayed on a display device, the modes being selectable using the user input device; and
      outputting a sensor reading upon detecting the manipulation of the user input device,
      wherein at least a portion of the controller is normally in a low power hibernate state,
      wherein manipulation of the user input device causes at least a portion of the controller to wake from the hibernate state to output the sensor reading,
      wherein the controller exits the hibernate state without user input to take sensor readings,
      wherein the output sensor reading is selected from a group consisting of a current reading, a maximum reading and a minimum reading of the sensor,
      wherein the visual display device provides a visual indicator of occurrence of an alarm condition; and
   an RFID interrogator in communication with the RFID tags.

* * * * *

UNITED STATES PATENT AND TRADEMARK OFFICE
CERTIFICATE OF CORRECTION

PATENT NO. : 7,796,038 B2
APPLICATION NO. : 11/423699
DATED : September 14, 2010
INVENTOR(S) : Naresh Batra Page 1 of 1

It is certified that error appears in the above-identified patent and that said Letters Patent is hereby corrected as shown below:

In the body:
col. 2, line 30 change "interests" to --interest--.
col. 3, line 11 change "form" to --from--.
col. 4, line 3 change "al" to --a--.
col. 4, line 51 change "terns" to --terms--.
col. 8, line 17 delete "." after "A".
col. 8, line 30 change "REID" to --RFID--.
col. 9, line 55 change "stips" to --strips--.
col. 10, line 11 change "hi-stable" to --bi-stable--.
col. 10, line 43 delete "," after "visually".
col. 10, line 65 delete "co" after "in".
col. 11, line 43 after "Further" add --,--.
col. 12, line 26 after "shown" add --in--.
col. 12, line 29 change "Preferable" to --Preferably--.
col. 12, line 30 after "reset" add --,--.
col. 12, line 48 change "device" to --display--.
col. 13, line 37 before "alarm" add --an--.
col. 13, line 66 after "state" add --,--.
col. 14, line 39 delete "," after "tag".
col. 14, line 64 after "output" add --an--.
col. 16, line 29 change "at" to --a--.
col. 16, line 35 change "," to --.--.
col. 16, line 47 after "F" delete --.--.
col. 16, line 48 after "F" delete --.--.
col. 18, line 21 change "track" to --truck--.

Signed and Sealed this
Twenty-fifth Day of January, 2011

David J. Kappos
*Director of the United States Patent and Trademark Office*